(12) United States Patent
Kim et al.

(10) Patent No.: US 9,851,817 B2
(45) Date of Patent: Dec. 26, 2017

(54) OPTICAL TOUCH DISPLAY DEVICE AND DRIVING METHOD THEREOF

(71) Applicant: LG Display Co., Ltd., Seoul (KR)

(72) Inventors: Jung Hee Kim, Seoul (KR); Ki Duk Kim, Paju-si (KR); Jong Hee Hwang, Goyang-si (KR); Seung Seok Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 143 days.

(21) Appl. No.: 14/748,172

(22) Filed: Jun. 23, 2015

(65) Prior Publication Data

US 2015/0370353 A1 Dec. 24, 2015

(30) Foreign Application Priority Data

Jun. 23, 2014 (KR) .................. 10-2014-0076781
Jun. 16, 2015 (KR) .................. 10-2015-0085230

(51) Int. Cl.
| G06F 3/0354 | (2013.01) |
| G06F 3/03 | (2006.01) |
| G06F 3/041 | (2006.01) |
| G06F 3/042 | (2006.01) |
| G09G 5/02 | (2006.01) |
| G09G 5/10 | (2006.01) |

(52) U.S. Cl.
CPC ........ G06F 3/03545 (2013.01); G06F 3/0304 (2013.01); G06F 3/0321 (2013.01); G06F 3/042 (2013.01); G06F 3/0412 (2013.01); G09G 5/02 (2013.01); G09G 5/10 (2013.01)

(58) Field of Classification Search
None
See application file for complete search history.

(56) References Cited

U.S. PATENT DOCUMENTS

| 6,476,809 | B1* | 11/2002 | Browne | ............... G06T 11/40 345/423 |
| 6,862,687 | B1* | 3/2005 | Suzuki | ............... G06F 21/36 726/18 |
| 2004/0090431 | A1* | 5/2004 | Kong | ............... G06F 3/0414 345/173 |
| 2008/0102912 | A1* | 5/2008 | Tawara | ............... A63F 13/10 463/9 |
| 2010/0141785 | A1 | 6/2010 | Kim et al. | |
| 2010/0164912 | A1 | 7/2010 | Soga et al. | |
| 2011/0025624 | A1* | 2/2011 | Goto | ............... G06F 3/0481 345/173 |
| 2012/0044168 | A1* | 2/2012 | Lu | ............... G06F 3/0321 345/173 |

(Continued)

*Primary Examiner* — James A Thompson
(74) *Attorney, Agent, or Firm* — Fenwick & West LLP

(57) ABSTRACT

An optical touch display device which is advantageous in high-speed driving, large-area touch sensing, and multi-touch sensing because of use of an image map and which can improve touch sensing performance and a driving method thereof are provided. The optical touch display device includes a display device configured to display a display image based on input source image data and an image map for touch sensing, an optical touch pen configured to detect map information of the image map displayed on the display device, and a position detector configured to detect position information (coordinate information) on a screen based on the map information.

18 Claims, 16 Drawing Sheets

(56) References Cited

U.S. PATENT DOCUMENTS

| | | | |
|---|---|---|---|
| 2013/0229389 A1* | 9/2013 | DiVerdi | G06F 3/0488 345/179 |
| 2014/0333681 A1* | 11/2014 | Oh | G09G 3/2003 345/690 |
| 2015/0130847 A1* | 5/2015 | Masuoka | G09G 3/20 345/665 |

* cited by examiner source image

⇩ change of image data for each pixel image including position information (coordinates)

< frames for compensating for image distortion are sequentially arranged >

OPTICAL TOUCH DISPLAY DEVICE AND DRIVING METHOD THEREOF

CROSS REFERENCE TO RELATED APPLICATIONS

This application claims the benefit of Korean Patent Application Nos. 10-2014-0076781 filed on Jun. 23, 2014, and 10-2015-0085230 filed on Jun. 16, 2015, both of which are hereby incorporated by reference for all purposes as if fully set forth herein.

BACKGROUND OF THE INVENTION

Field of the Invention

The present invention relates to an optical touch display device, and more particularly, to an optical touch display device which is advantageous in high-speed driving, large-area touch sensing, and multi-touch sensing because of use of an image map and which can improve touch sensing performance and a driving method thereof.

Discussion of the Related Art

Instead of a mouse or a keyboard which was used as an input unit of a flat panel display device in the past, a touch screen device in which a user can input information directly to a screen using a finger or a pen has been used.

A touch screen device is applied to monitors of a navigation apparatus, an industrial terminal, a notebook computer, banking automation equipment, a game machine, and the like; portable terminals such as a mobile phone, an MP3, a PDA, a PMP, a PSP, a portable game machine, a DMB receiver, and a tablet PC; and household electrical appliances such as a refrigerator, a microwave oven, and a washing machine, and has been used more widely with a merit that it can be easily manipulated by any one.

Various types of touch screens have been developed and used such as a resistive type, an electro-magnetic type, an infrared type, and a capacitive type.

FIG. 1 is a diagram schematically illustrating an infrared type touch screen device according to the related art.

Referring to FIG. 1, the infrared type touch screen device according to the related art includes an infrared LED disposed on one side surface of a waveguide formed of reinforced glass or plastics, a projector disposed under the waveguide and configured to emitting a display beam, and an infrared camera disposed under the waveguide.

When a user touches a screen displayed on the entire surface of the waveguide, infrared rays totally reflected in the waveguide are refracted to the bottom of the waveguide and the infrared rays are received using the infrared camera, whereby the touch is sensed. At this time, an angle at which the infrared rays are sensed is calculated to detect a touched position.

Since such an infrared type touch screen device has to include the infrared camera, there is a problem in that the number of manufacturing processes and the manufacturing costs increase and the size and thickness of the device increase.

Capacitive type touch devices can be classified into an in-cell type in which a touch device is incorporated in cells of a display panel, an on-cell type in which a touch device is formed on a display panel, and an add-on type in which a touch screen is particularly coupled to the top of a display device. In recent years, the in-cell type touch screen having a merit in beautiful design and slimness has been used more and more.

FIG. 2 is a diagram schematically illustrating an in-cell type touch display device according to the related art.

Referring to FIG. 2, the in-cell touch type display device according to the related art includes a display panel, a gate driver (not illustrated), a data driver (not illustrated), and a touch driver (not illustrated).

Plural sub-pixels are formed in the display panel, and a touch screen is formed by plural touch electrodes 10. Here, the touch electrodes 10 are formed in the display panel 1 along with the sub-pixels. Common electrodes formed to supply a common voltage Vcom to the sub-pixels are used as the touch electrodes 10.

The plural touch electrodes 10 include plural drive electrodes 12 (TX electrodes) supplied with a touch driving signal (TC signal) and plural reception electrodes 14 (RX electrodes) for sensing a touch. The plural reception electrodes 14 can be formed in the form of single wires to have a bar shape from the upper end to the lower end of the display panel 1. The plural drive electrodes 12 can be grouped by a predetermined number of pixels.

Plural drive electrode lines 20 supplying a touch drive signal to the plural drive electrodes 12 are formed in the display panel 1. The plural drive electrodes 12 formed in the same horizontal line are connected by the drive electrode line 20. In addition, plural reception electrode lines 30 sensing capacitance of the plural reception electrodes 14 are formed.

The touch driver includes a touch driving integrated circuit (IC) and a touch sensing integrated circuit (IC). The touch driving IC is connected to the plural drive electrode lines 20 to supply a touch driving signal to the plural drive electrodes 12. The touch sensing IC is connected to the plural reception electrode lines 30 to senses a touch signal.

In such an in-cell touch type display device according to the related art, since the plural drive electrode lines 20 and the plural reception electrode lines 30 have to be formed to cross each other in order to use common electrodes in the display panel as the touch electrodes 10, there is a problem in that the number of manufacturing processes increases.

In the in-cell touch type, the drive electrodes 12 and the distance between the electrodes is small because the reception electrodes 14 are formed on the same plane, and parasitic capacitance increases because the plural drive electrode lines 20 and the plural reception electrode lines 30 are formed in cells. There is a problem in that the larger of the screen of the display panel becomes, the greater the parasitic capacitance becomes geometrically and the sensing performance of the touch sensing IC is lowered when the parasitic capacitance becomes greater. Accordingly, an increase in size of the in-cell touch type display device is restricted.

SUMMARY OF THE INVENTION

The invention is made to solve the above-mentioned problems and an object thereof is to provide an optical touch display device capable of sensing a large-area touch and a driving method thereof.

Another object of the invention is to provide an optical touch display device which is advantageous in multi-touch sensing using an image map and which can improve touch sensing performance and a driving method thereof.

In addition to the above-mentioned technical object of the invention, other features and advantages of the invention will be described below or will be apparently understood by those skilled in the art from the description and explanation.

According to an aspect of the invention, there is provided an optical touch display device including: a display device configured to display a display image based on input source image data and an image map for touch sensing; an optical touch pen configured to detect map information of the image map displayed on the display device; and a position detector configured to detect position information (coordinate information) on a screen based on the map information.

According to another aspect of the invention, there is provided a method of driving an optical touch display device, including: arranging source image data of sub-pixels in the unit of frames and generating an image map for touch sensing; generating corrected image data by subtracting image data of the image map from the source image data; alternately displaying an image based on the corrected image data and the image map; and sensing map information of a specific position on the image map using an optical touch pen having an optical camera built therein.

According to still another aspect of the invention, there is provided a method of driving an optical touch display device, including: mapping position information for touch sensing onto image data supplied to sub-pixels; sensing map information of a specific position on an image map using an optical touch pen having an optical camera built therein; and detecting a coordinate touched by the optical touch pen using the position information matched onto the map information.

In the optical touch display device and the driving method thereof according to the invention, it is possible to perform displaying of a screen and sensing of a touch with high-speed driving using an image map.

In the optical touch display device and the driving method thereof according to the invention, it is possible to perform large-area touch sensing and multi-touch sensing using an image map.

In the optical touch display device and the driving method thereof according to the invention, it is possible to improve touch sensing performance using an image map.

Other features and advantages of the invention may be newly understood from embodiments of the invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EXEMPLARY EMBODIMENTS

Figure 1:
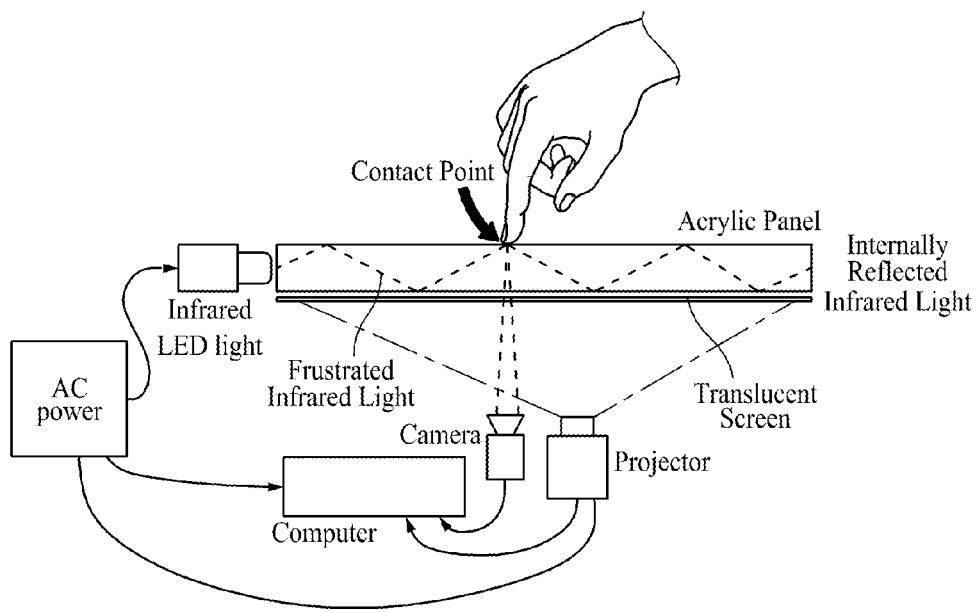
FIG. 1 is a diagram schematically illustrating an infrared type touch screen device according to the related art.
Figure 2:
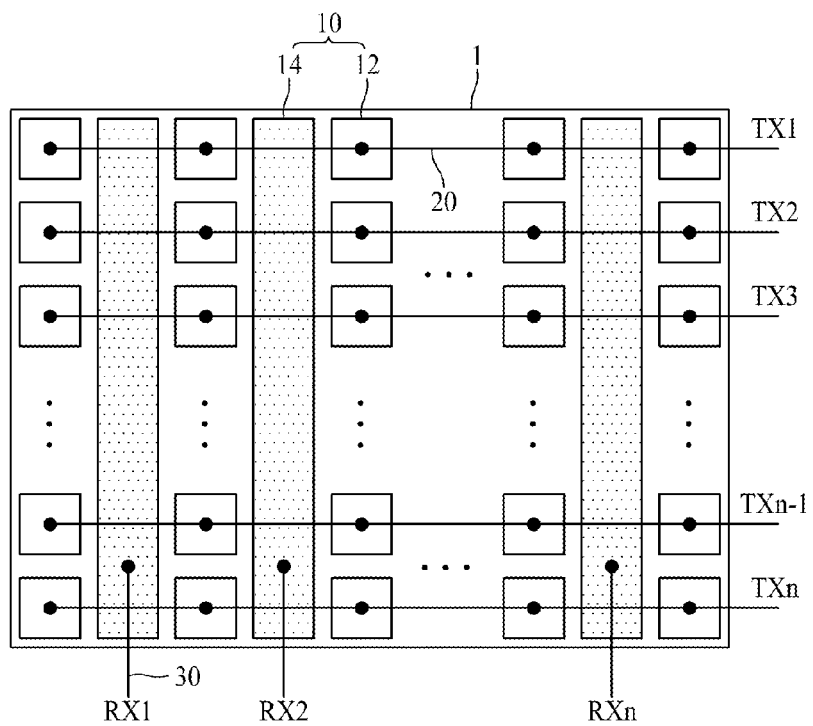
FIG. 2 is a diagram schematically illustrating an in-cell touch type display device according to the related art.

Reference will now be made in detail to the exemplary embodiments of the present invention, examples of which are illustrated in the accompanying drawings. Wherever possible, the same reference numbers will be used throughout the drawings to refer to the same or like parts. In the following description of the present invention, if detailed description of elements or functions known in the art of the present invention is not related to the subject matter of the present invention, the detailed description will be omitted.

Advantages and features of the invention and methods for achieving the advantages or features will be apparent from embodiments described below in detail with reference to the accompanying drawings. However, the invention is not limited to the embodiments but can be modified in various forms. The embodiments are merely for completing disclosure of the invention and are provided to completely inform those skilled in the art of the scope of the invention. The scope of the invention is defined by only the appended claims.

Shapes, sizes, ratios, angles, number of pieces, and the like illustrated in the drawings for the purpose of explaining the embodiments of the invention are exemplary and thus the invention is not limited to the illustrated items. Like reference numerals in the entire specification denote like elements. When it is determined that detailed description of known techniques involved in the invention makes the gist of the invention obscure, the detailed description thereof will not be made. When "include," "have," "be constituted", and the like are mentioned in the specification, another element may be added unless "only" is used. A singular expression of an element includes two or more elements unless differently mentioned.

In analyzing elements, an error range is included even when explicit description is not made.

For example, when temporal relationships are described using "after", "subsequent to", "next", "before", and the like, such expression may include temporal discontinuity unless "immediately" or "directly" is used.

Terms "first", "second", and the like can be used to describe various elements, but the elements should not be limited to the terms. The terms are used only to distinguish an element from another. Therefore, a first element may be a second element within the technical spirit of the invention.

Features of the embodiments of the invention can be coupled or combined partially or on the whole and can be technically interlinked and driven in various forms. The embodiments may be put into practice independently or in combination.

Hereinafter, a display device with a touch screen assembled thereto and a driving method thereof according to embodiments of the invention will be described in detail with reference to the accompanying drawings. Like reference numerals all over the specification denote like elements. In the following explanation, detailed description of configurations and functions widely known in the art and not associated with the core configuration of the invention will not be made.

In an optical touch display device and a driving method thereof according to an embodiment of the invention, an image map including plural pieces of map information is constituted and the image map is alternately inserted and displayed between display images. The map information of the image map is detected using an optical touch pen and position information (coordinate information) of a position touched with the pen is detected based on the map information. Accordingly, it is possible to achieve touch sensing without constructing a physical touch screen into the display device.

The inventors of the present invention propose various types of image maps.

A color map in which coordinates are constituted by plural colors is proposed as an example of the image map.

A gray map in which coordinates are constituted by plural gray scales of an image is proposed as another example of the image map.

A pattern map in which coordinates are constituted by predetermined patterns is proposed as still another example of the image map.

As still another example of the image map, position information (coordinate information) is included in source image data to constitute an image map using a display image itself.

A method of detecting position information (coordinate information) of a position touched with a pen using the image maps is proposed.

Figure 3:
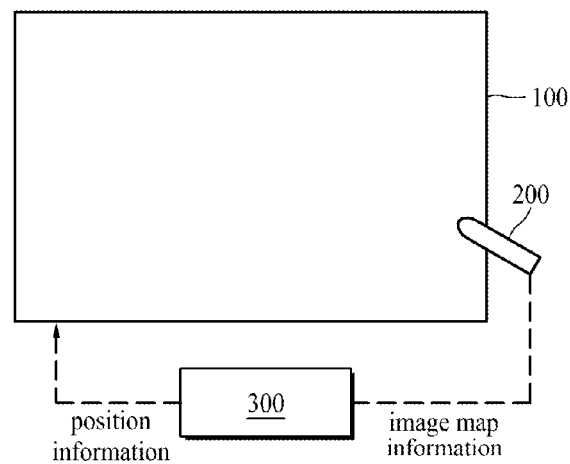
FIG. 3 is a diagram schematically illustrating an optical touch display device according to an embodiment of the invention.
Figure 4:
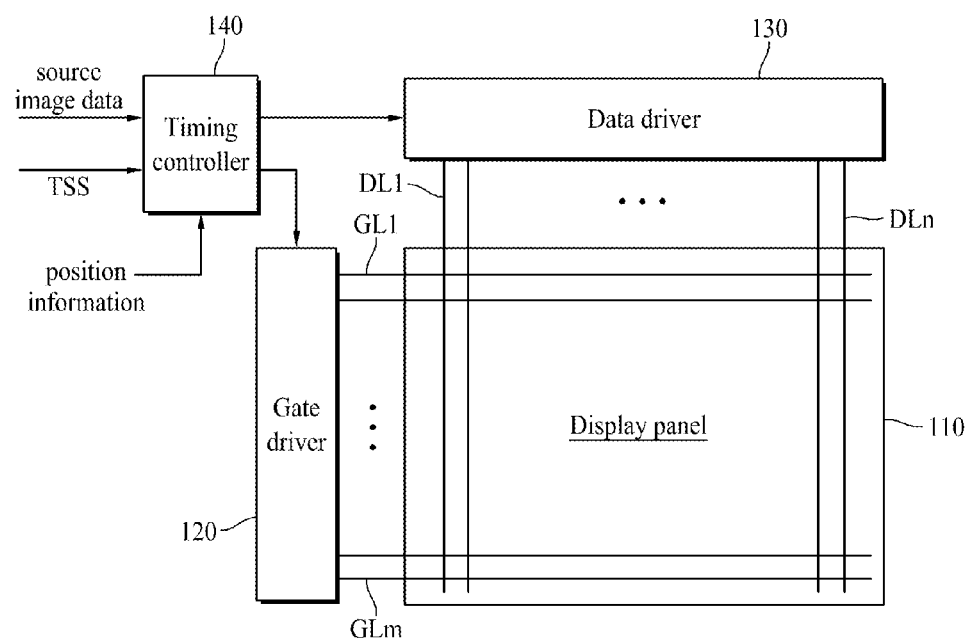
FIG. 4 is a diagram illustrating a display panel illustrated in FIG. 3.

FIG. 3 is a diagram schematically illustrating an optical touch display device according to an embodiment of the invention. FIG. 4 is a diagram illustrating a display panel illustrated in FIG. 3.

Referring to FIGS. 3 and 4, the optical touch display device according to the embodiment of the invention includes a display device 100, an optical touch pen 200, and a position detector 300.

The display device 100 includes a display panel 110 on which an image is displayed and a drive circuit unit. The drive circuit unit includes a gate driver 120, a data driver 130, and a timing controller 140.

A liquid crystal display panel can be used as the display panel 110. However, the display panel 110 is not limited to the liquid crystal display panel and an organic electroluminescence display panel may be used. In the following description, it is assumed that a liquid crystal display panel is used as the display panel 110.

The gate driver 120, the data driver 130, and the timing controller 140 may be constituted by individual IC chips or may be constituted by a single IC chip. On the other hand, the gate driver 120 may be integrated on a lower substrate (TFT array substrate) of the display panel 110 in an amorphous silicon gate (ASG) manner or a gate-in-panel manner.

The display panel 110 includes an upper substrate (color filter array substrate), a lower substrate (TFT array substrate), and a liquid crystal layer interposed between the upper substrate and the lower substrate.

R, G, B color filters for converting light incident from sub-pixels into color light to display a color image are formed on the upper substrate. Plural gate lines and plural data lines are formed to cross each other on the lower substrate, whereby plural sub-pixels are defined.

Plural pixels are arranged in a matrix shape and each pixel includes three sub-pixels (RGB) or four sub-pixels (RGBW). TFTs as switching elements, storage capacitors, pixel electrodes, and common electrodes are formed on the lower substrate.

Alignment of liquid crystal is adjusted by an electric field based on a data voltage of a pixel electrode and a common voltage Vcom supplied to the common electrode. In this way, transmittance of light emitted from a backlight unit is adjusted using the alignment of the liquid crystal to display an image.

Figure 5A:
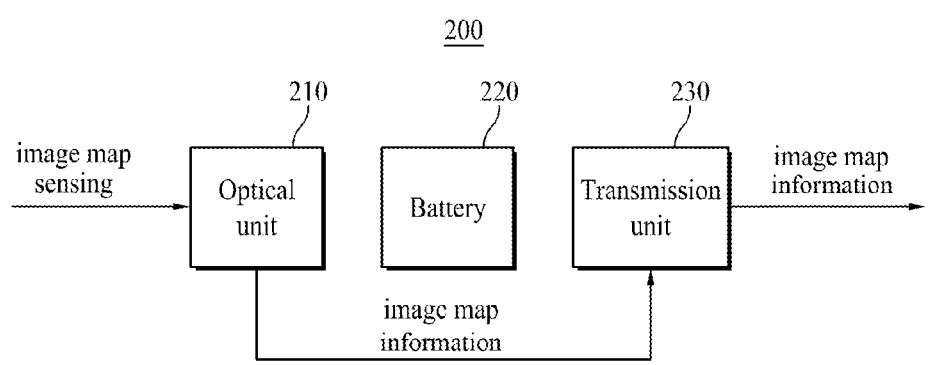
FIG. 5A is a diagram illustrating an optical touch pen of the optical touch display device according to the embodiment of the invention.

FIG. 5A is a diagram illustrating an optical touch pen of the optical touch display device according to the embodiment of the invention.

Referring to FIGS. 3 to 5A, an optical touch pen 200 includes an optical unit 210, a battery 220, and a transmission unit 230. The optical touch pen 200 is a portable unit and thus is supplied with driving power from the battery 220 built therein.

The optical unit 210 is constituted by an optical camera including a charge coupled device (CCD) sensor or a CMOS image sensor (CID). When the optical touch pen 200 approaches or touches the display panel 110, map information (such as color information, gray information, pattern information, or image information) of an image map displayed on the display panel 110 is recognized by the optical unit 210.

The map information of the image map recognized by the optical unit 210 is input to the transmission unit 230. The transmission unit 230 transmits the map information of the image map to the position detector 300 in a wireless communication manner.

The position detector 300 detects a position approached or touched by the optical touch pen 200 on the display panel 110 based on the map information received from the transmission unit 230 of the optical touch pen 200.

A color map of the image map is generated by combining plural color patterns, and the color patterns have different colors. That is, each color pattern has unique color information and positions of the color patterns are set in advance on the color map.

The position detector 300 includes a lookup table in which position information of the map patterns on the image map is stored. For example, position information of the color patterns on the color map is provided in the form of a lookup table. The color information in the lookup table corresponding to the color information received by the optical touch pen 200 is checked.

By checking the position information of the color area detected by the optical touch pen 200, it is possible to detect the position of the color recognized by the optical touch pen 200 on the color map. That is, it is possible to detect a position approached or touched by the optical touch pen 200 on the display panel 110. Thereafter, the position detector 300 transmits the detected position information to the display device 100 in a wireless communication manner.

The display device 100 displays a part corresponding to the position information on the display panel 110 based on the position information received from the position detector 300. For example, a part corresponding to the position information is displayed as a mouse point on the display panel 110.

For this purpose, the timing controller 140 generates position image data corresponding to the position information, adds the position image data corresponding to the position information to display image data to be displayed on the screen, and transmits the resultant to the data driver 130.

The data driver 130 converts the image data, in which the display image data and the position image data are combined, into an analog data voltage and supplies the analog data voltage to the plural data lines formed on the display panel 110 to display an image on the screen.

On the other hand, the timing controller 140 generates image map image data based on the image map and supplies the generated image map image data to the data driver 130.

The display image data for displaying an image on the screen and the image map image data for displaying the image map on the screen can alternately be generated for each frame and can be supplied to the data driver 130.

For example, the display image data for displaying an image on the screen and the image map image data for displaying the image map on the screen may be alternately generated for each ½ frame and may be supplied to the data driver 130.

For example, the display image data for displaying an image on the screen may be supplied to the data driver 130 during two or four frames and then the image map image data for displaying the image map on the screen may be supplied thereto during one frame.

The position detector 300 is described above as an independent unit, which is only one of various embodiments of the invention.

As described above, the invention proposes various types of image maps. The color map in which coordinates are constituted by plural colors, the gray map in which coordinates are constituted by gray scales of an image, a pattern map in which coordinates are constituted by predetermined patterns, and a method of generating an image map using a display image itself in which position information is included in the source image data. The color map, the gray map, and the pattern map are displayed alternately along with a source image. On the other hand, when the source image data includes position information, the source image and the image map are not distinguished and an image including position information is displayed in one frame. The specific configuration of the image map will be described later with reference to FIGS. 8 to 21.

Figure 6:
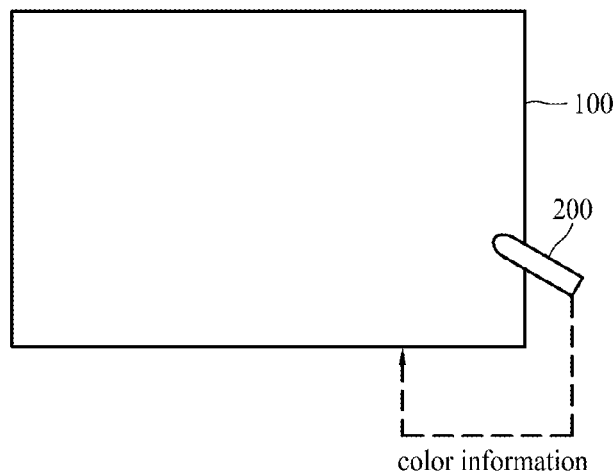
FIG. 6 is a diagram schematically illustrating an optical touch display device according to another embodiment of the invention.
Figure 7:
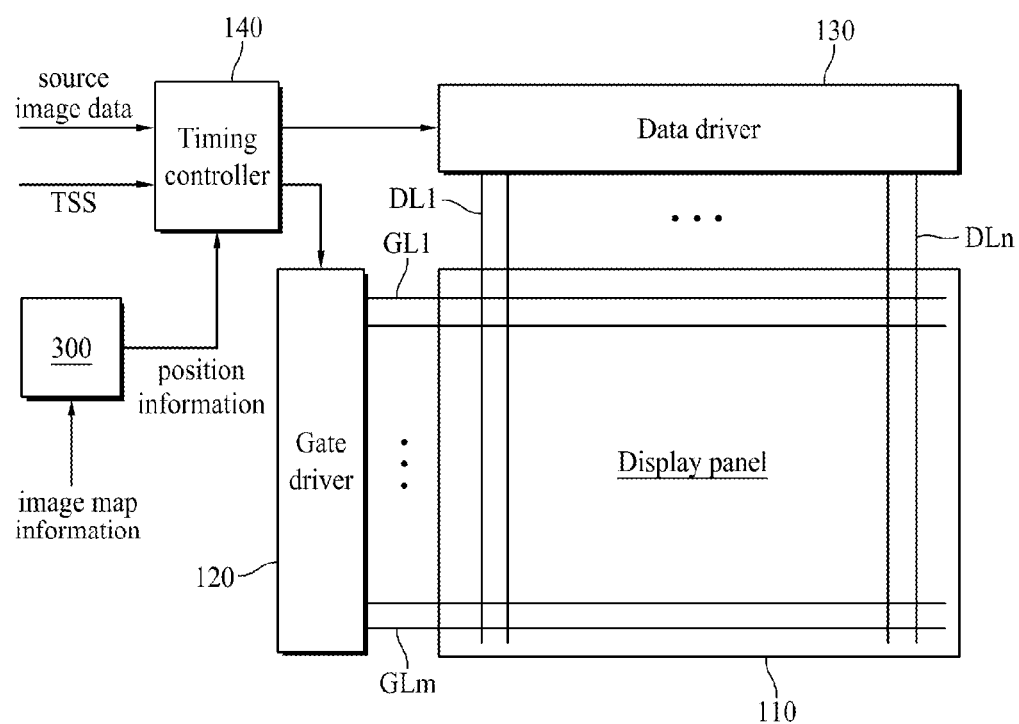
FIG. 7 is a diagram illustrating a display panel illustrated in FIG. 6.

FIG. 6 is a diagram schematically illustrating an optical touch display device according to another embodiment of the invention. FIG. 7 is a diagram illustrating a display panel illustrated in FIG. 6.

In the optical touch display device according to another embodiment of the invention, the position detector 300 can be built in the display device 100.

When the display panel 110 is approached or touched by the optical touch pen 200, information (color information) of the image map displayed on the display panel 110 is recognized using the optical unit 210. In the following description, it is assumed that the color map is used as the image map. The color information of the color map recognized by the optical unit 210 is input to the transmission unit 230. The transmission unit 230 transmits the color information (or color information of each block when the screen is segmented into plural blocks) of each pixel included in the color map to the position detector 300 of the display device 100 in a wireless communication manner.

The position detector 300 built in the display device 100 detects a position approached or touched by the optical touch pen 200 on the display panel 110 based on the color information received from the transmission unit 230 of the optical touch pen 200.

Figure 5B:
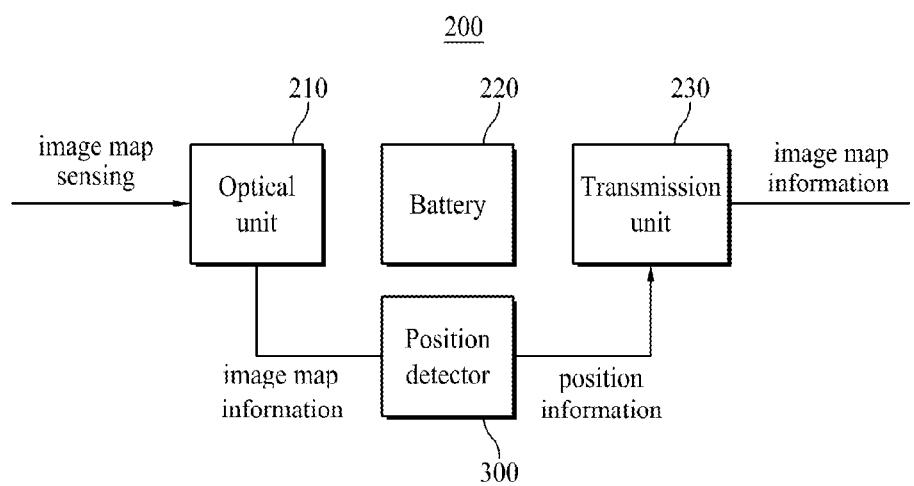
FIG. 5B is a diagram illustrating an optical touch pen of an optical touch display device according to another embodiment of the invention.

FIG. 5B is a diagram illustrating an optical touch pen of the optical touch display device according to another embodiment of the invention. For example, referring to FIG. 5B, the position detector 300 may be built in the optical touch pen 200.

The position detector 300 built in the optical touch pen 200 detects a position approached or touched by the optical touch pen 200 on the display panel 110 based on the detected color information. The detected position information is transmitted to the display device 100 in a wireless communication manner.

The processes after the optical touch pen 200 detects the position approached or touched on the screen are equal or similar to those described above with reference to FIGS. 3 to 5A.

A specific embodiment for achieving touch sensing using a color map will be described below.

Figure 8:
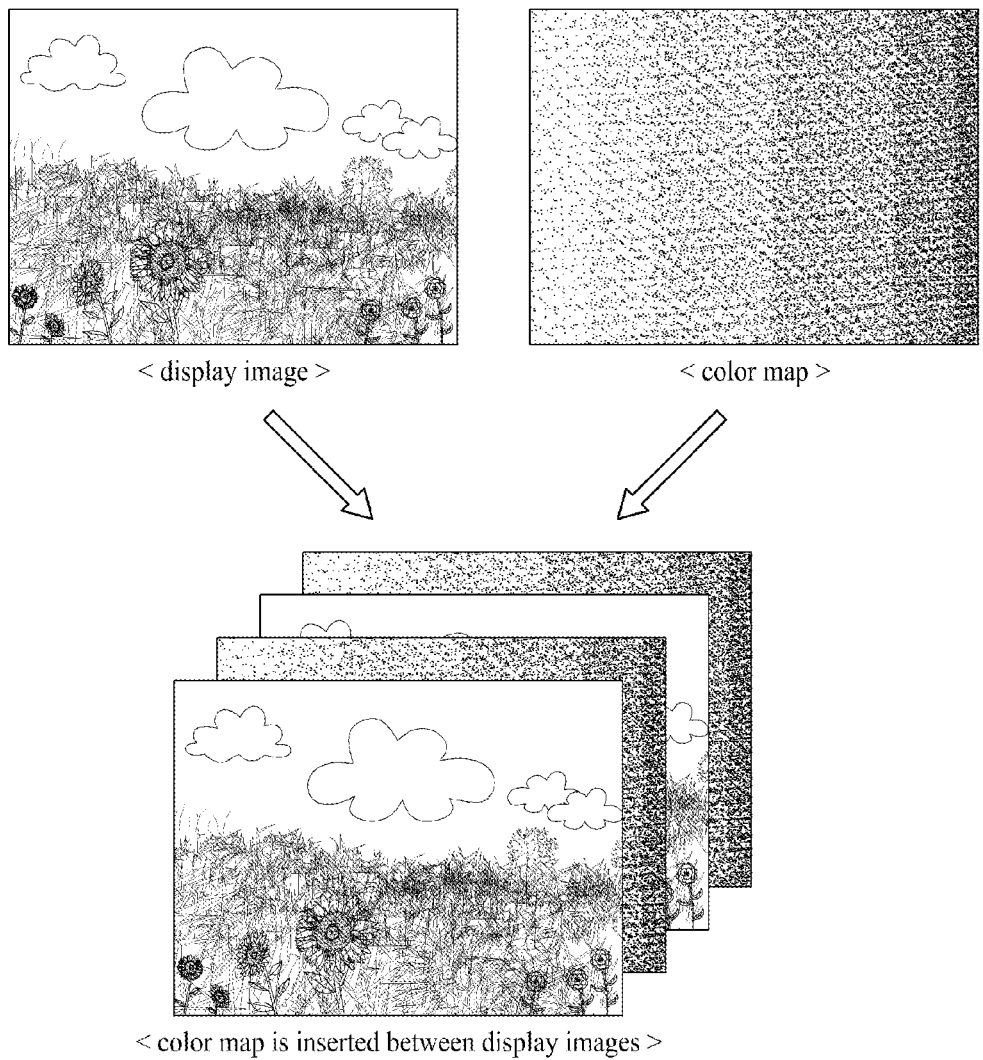
FIG. 8 is a diagram illustrating a state in which a display image and an image map are alternately displayed.
Figure 9:
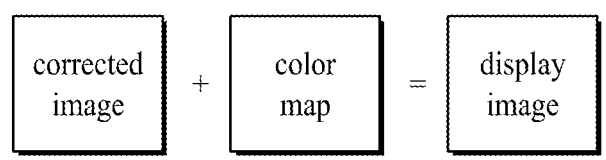
FIG. 9 is a diagram illustrating a method of preventing distortion of a display image due to a color map.

FIG. 8 is a diagram illustrating a state in which a display image and an image map are alternately displayed. FIG. 9 is a diagram illustrating a method of preventing distortion of a display image due to a color map.

Referring to FIGS. 8 and 9, in alternately displaying a display image to be displayed and a color map on the screen of the display device, the display image and the color map can alternately be displayed for each frame.

However, the invention is not limited to this example, but the display image and the color map may alternately be displayed for each ½ frame in alternately displaying the display image and the color map. For example, the display image may be displayed during two to four frames and then the color map may be displayed during one frame.

Since the color map has independent colors regardless of the display image, interference occurs in the display image due to the color map and distortion may occur in the image actually displayed on the screen.

In the invention, in order to prevent the distortion of the display image due to the color map, the source image data is not displayed without any change, but an image corrected by reflecting the interference due to the color map in the source image is displayed. That is, the display image in which the interference due to the color map has been corrected is displayed.

For this purpose, the timing controller 140 corrects the source image data of the sub-pixels based on the generated color map data. The image data of a sub-pixel of which luminance increases due to the color map data is corrected to decrease in luminance, and the image data of a sub-pixel of which luminance decreases is corrected to increase in luminance. In addition to the luminance, the color components of the sub-pixels are corrected based on the color map data. Accordingly, even when a color map frame is inserted between the frames of the display image, distortion (flicker and color break-up) does not occur in the image actually displayed on the screen.

For example, the source image data of the pixels can be corrected such that a luminance difference between the display image and the color map is equal to or less than 10%.

For example, the color map can be generated such that a luminance difference between the display image and the color map is equal to or less than 10%. That is, in the step of generating a color map, the color map can be generated based on the display image such that a luminance difference from the display image is equal to or less than 10%. Accordingly, even when a color map frame is inserted between the frames of the display image, distortion (flicker and color break-up) does not occur in the image actually displayed on the screen.

Figure 10:
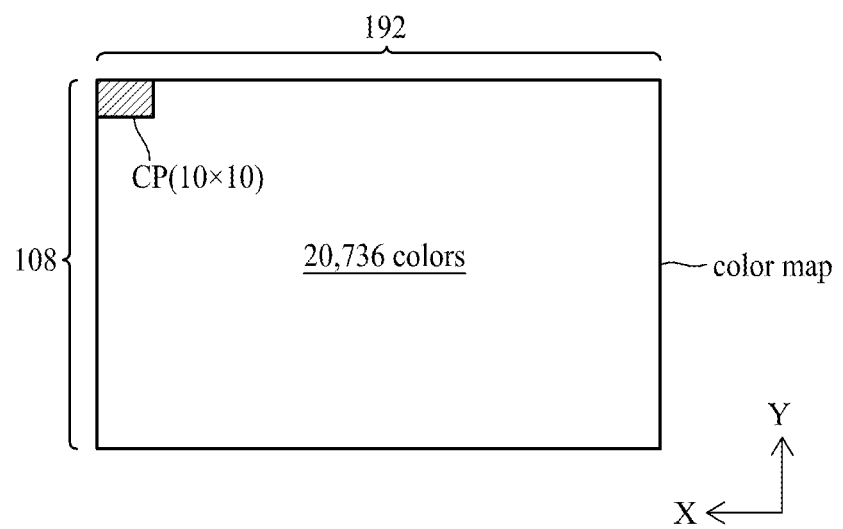
FIG. 10 is a diagram illustrating a color map.
Figure 11:
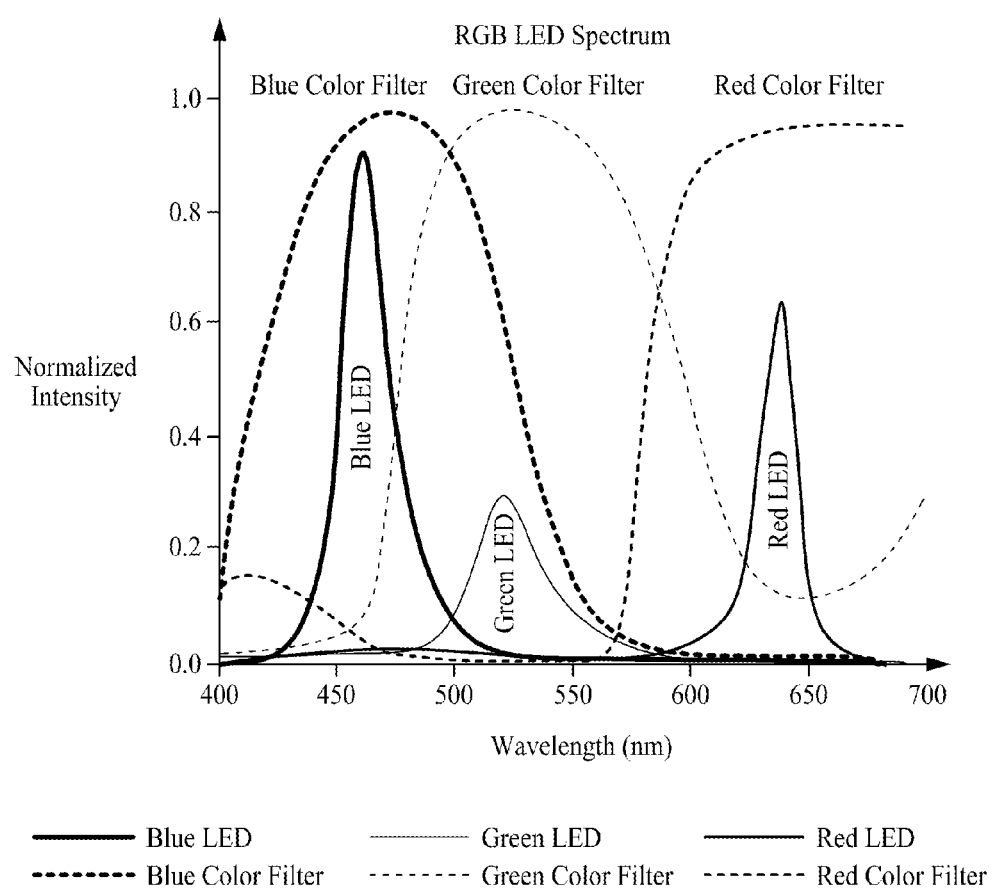
FIG. 11 is a diagram illustrating a method of reducing interference between color patterns constituting a color map.

FIG. 10 is a diagram illustrating a color map. FIG. 11 is a diagram illustrating a method of reducing interference between color patterns constituting a color map.

Referring to FIGS. 10 and 11, when the display device displays an image with a resolution of full-HD class (1920×1080) and one color pattern is constituted by 10×10 pixels, a color map having total 20,736 color patterns by 192×108 combinations. That is, the screen can be segmented into 20,736 touch blocks to detect a touched position.

Here, 20,736 different colors are required to distinguish the color patterns and a color map having 20,736 color patterns using plural colors (for example, two or three colors) can be constituted in a two-dimensional space.

When two colors of neighboring wavelength bands among red, green, and blue colors are used, mutual interference may occur. Accordingly, a color map is generated using colors of wavelength bands not causing mutual interference.

For example, when blue and green are used, wavelength bands overlapping each other may exist. When green and red are used, wavelength bands overlapping each other may also exist. In this way, when the wavelength bands of two colors overlap in this way, position information based on independent colors cannot be generated and thus a color map should be generated using two colors of which the wavelength bands do not overlap each other. In the invention, for example, a color map having 20,736 color patterns is generated using two colors of blue and red.

Figure 12:
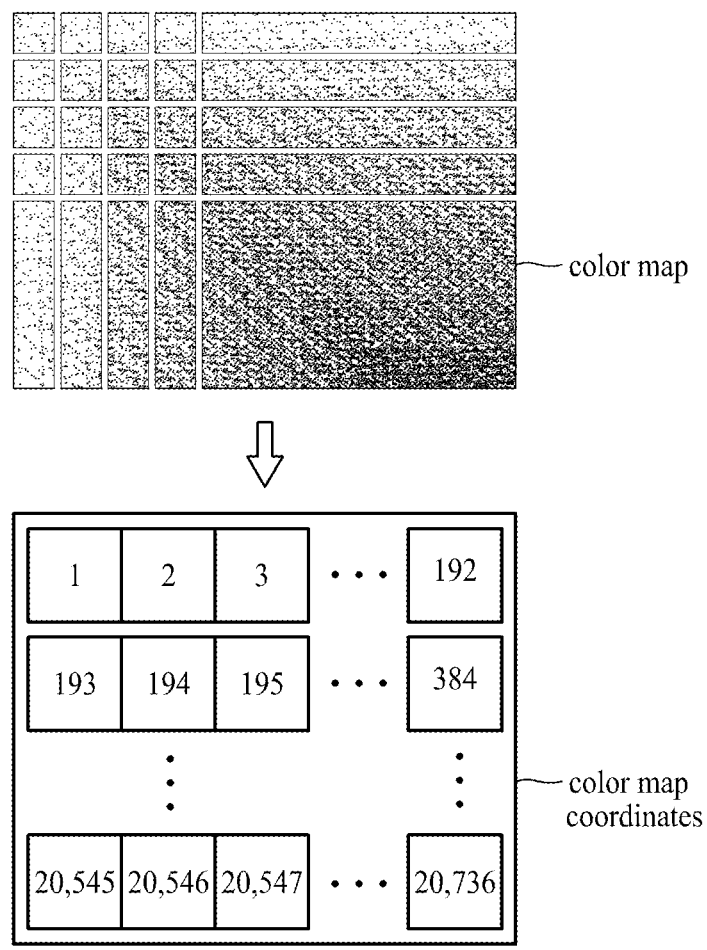
FIG. 12 is a diagram illustrating an example in which a color map is generated.

FIG. 12 is a diagram illustrating an example in which a color map is generated.

Referring to FIG. 12, two colors are rendered in a two-dimensional space to generate a color map. At this time, one color area (touch block) is set to have a constant block size (for example, 10×10 pixels). The entire color areas are segmented in the form of tiles (area segmentation) to generate a color map having 20,736 independent color areas.

Two colors are rendered in a two-dimensional space to generate a color map using an orthogonal coordinate system. For example, three colors may be rendered in a two-dimensional space to generate a color map using Legendre polynomials.

However, the invention is not limited to this example, but a color map may be generated using gray coordinates instead of generating a color map using plural colors.

The independent color areas, that is, the color patterns, can be labelled to distinguish position information of the color patterns. Regarding the labels assigned to the color patterns, 1 to 20,736 may be sequentially assigned to the first color pattern to the final color pattern to give position information to the color patterns.

Figure 13:
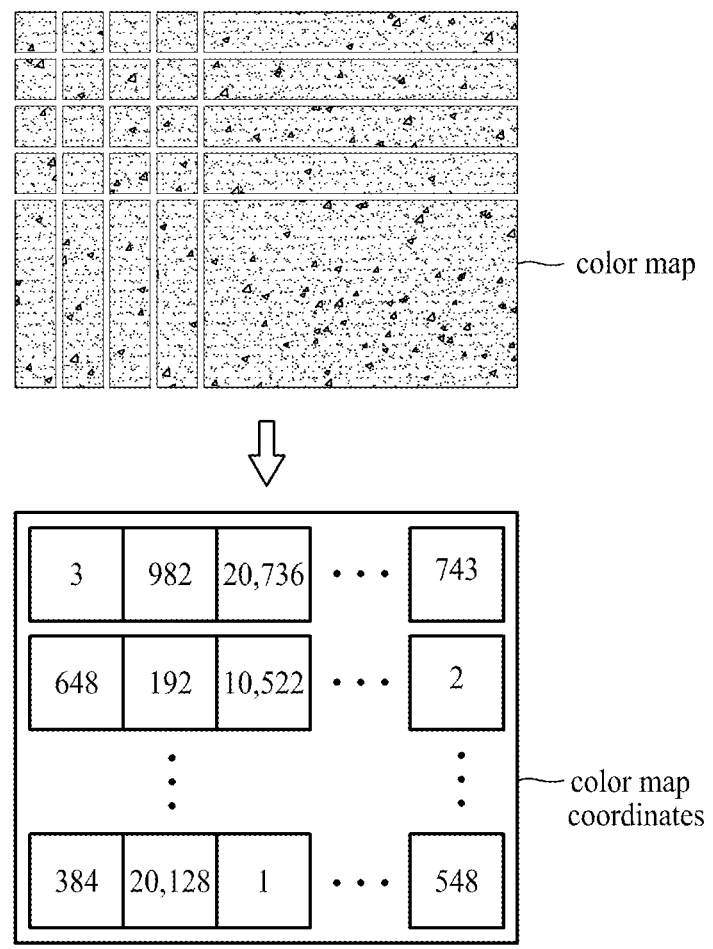
FIG. 13 is a diagram illustrating another example in which a color map is generated.

FIG. 13 is a diagram illustrating another example in which a color map is generated.

Referring to FIG. 13, two colors are rendered in a two-dimensional space to generate a color map. At this time, one color area (touch block) is set to have a constant block size (10×10 pixels). The entire color areas are segmented in the form of tiles (area segmentation) to generate a color map having 20,736 independent color areas.

The independent color areas, that is, the color patterns, are labelled. Thereafter, the labeled color patterns are shuffled in a random manner to rearrange the color patterns. The rearranged color patterns are uniquely labeled and thus position information of the color patterns can be distinguished from each other. When the color patterns constituting the color map are randomly rearranged, it is possible to reduce the distortion of a display image due to the color map.

Figure 14:
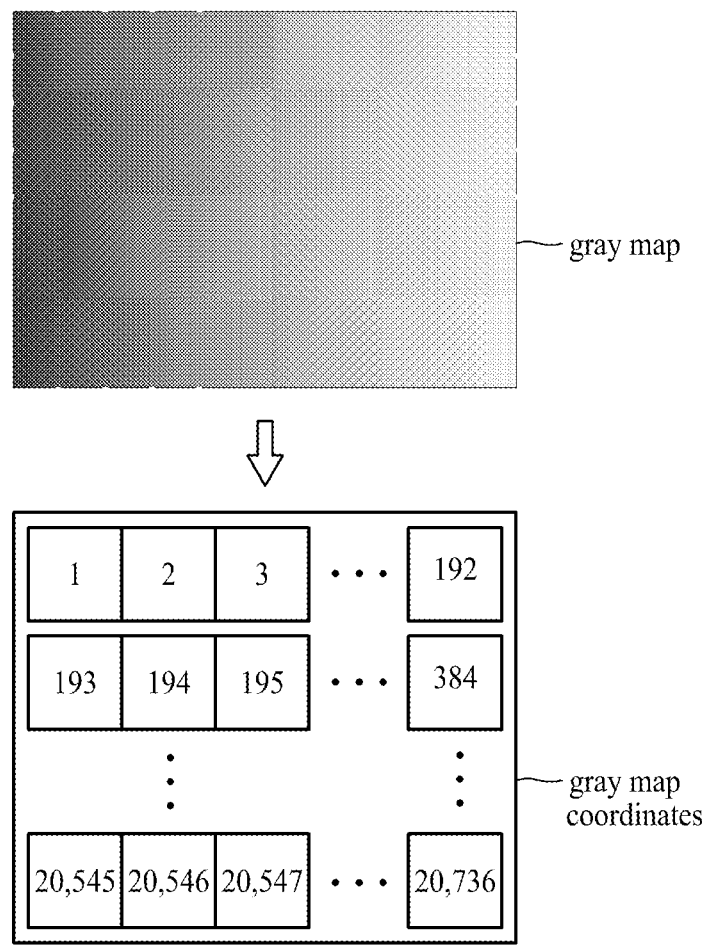
FIG. 14 is a diagram illustrating another example in which a gray map is generated.

FIG. 14 is a diagram illustrating another example in which a gray map is generated. Referring to FIG. 14, position information can be expressed by gray scales without using plural colors.

Specifically, gray patterns having different gray scales are rendered in a two-dimensional space to generate a gray map. At this time, one gray pattern (touch block) is set to have a constant block size (10×10 pixels). The entire gray patterns are segmented in the form of tiles (area segmentation) to generate a gray map having a predetermined number of independent gray patterns.

The independent gray patterns are labelled. Accordingly, the position information of the gray patterns can be distinguished. For example, regarding the labels assigned to the gray patterns, 1 to 20,736 may be sequentially assigned to the first gray pattern to the final gray pattern to give position information to the gray patterns.

Figure 15:
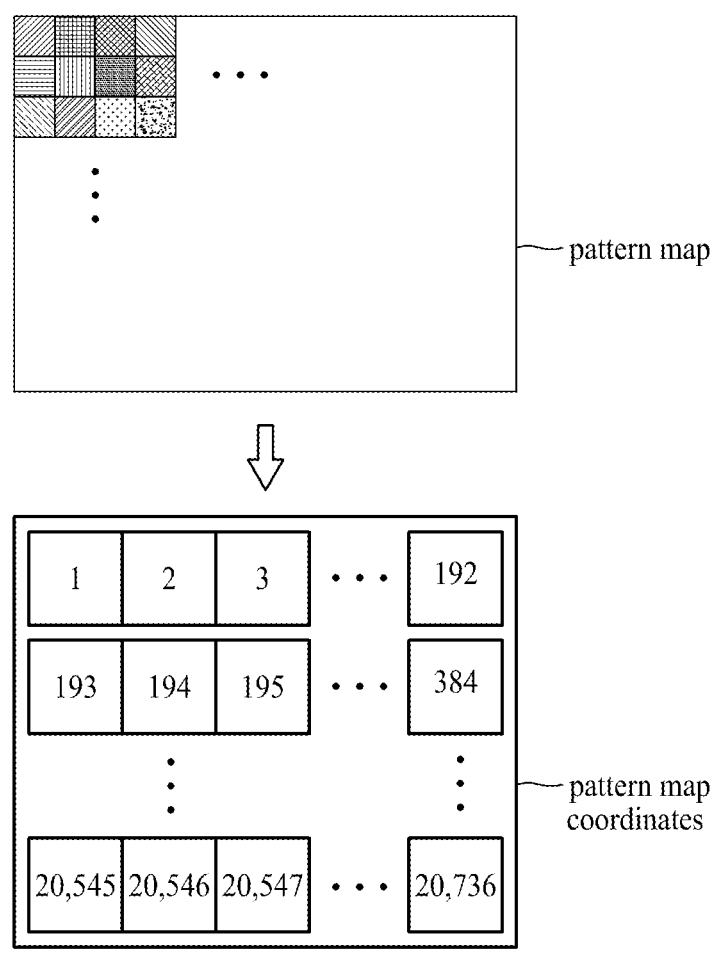
FIG. 15 is a diagram illustrating another example in which a pattern map is generated.
Figures 16, 17:
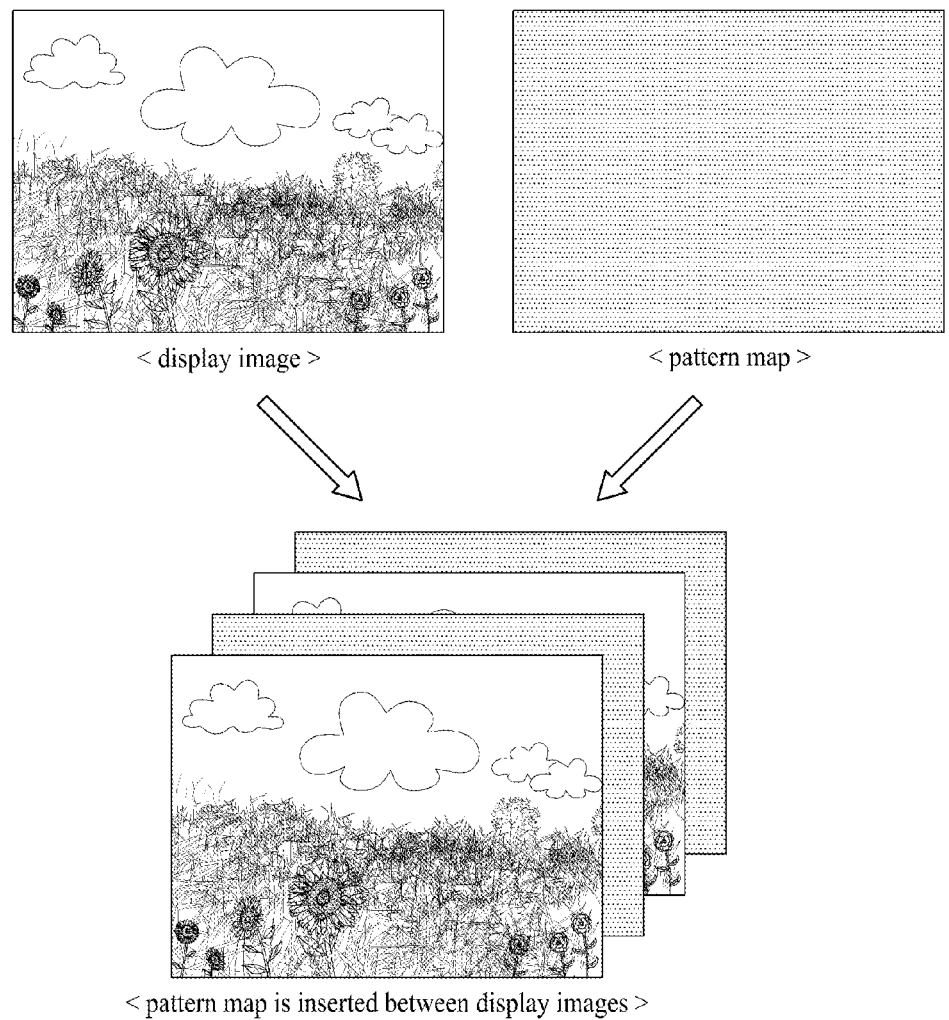
FIG. 16 is a diagram illustrating a state in which a display image and a pattern map are alternately displayed.
FIG. 17 is a diagram illustrating a method of preventing distortion of a display image due to a pattern map.

FIG. 15 is a diagram illustrating another example in which a pattern map is generated. FIG. 16 is a diagram illustrating a state in which a display image and a pattern map are alternately displayed.

Referring to FIGS. 15 and 16, different shapes of patterns are dispersed in a two-dimensional space to generate a pattern map. The independent pattern areas can be labeled to distinguish the position information of the pattern areas. The first pattern area and the final pattern area are sequentially labeled to give position information to the respective pattern areas.

Here, a pattern map is independent of a display image. It is possible to display position information of a screen by generating a pattern map using patterns with sizes (for example, 100 $\mu m^2$) which are not recognized with a viewer's eyes. It is possible to detect the position information of a position touched by a pen by inserting a special pattern map between display images in this way.

In alternately displaying a display image to be displayed and a pattern map on the screen of the display device, the display image and the pattern map can alternately be displayed for each frame.

However, the invention is not limited to this example, but the display image and the pattern map may alternately be displayed for each ½ frame in alternately displaying the display image and the pattern map. For example, the display image may be displayed during two to four frames and then the pattern map may be displayed during one frame.

FIG. 17 is a diagram illustrating a method of preventing distortion of a display image due to a pattern map.

Referring to FIG. 17, in order to prevent the distortion of the display image due to the pattern map, the source image data is not displayed without any change, but an image corrected by reflecting the interference due to the pattern map in the source image is displayed. That is, the display image in which the interference due to the color map has been corrected is displayed.

For this purpose, the timing controller 140 corrects the source image data of the sub-pixels based on the generated pattern map data. The image data of a sub-pixel of which luminance increases due to the pattern map data is corrected to decrease in luminance, and the image data of a sub-pixel of which luminance decreases is corrected to increase in luminance. In addition to the luminance, the color components of the sub-pixels can be corrected based on the pattern map data.

Accordingly, even when a pattern map frame is inserted between the display image frames, distortion (flicker and color break-up) does not occur in the image actually displayed on the screen.

For example, the source image data of the pixels can be corrected such that a luminance difference between the display image and the pattern map is equal to or less than 10%. For example, the pattern map can be generated such that a luminance difference between the display image and the pattern map is equal to or less than 10%. Accordingly, even when a pattern map is inserted between the display images, distortion (flicker and color break-up) does not occur in the image actually displayed on the screen.

Figure 18:
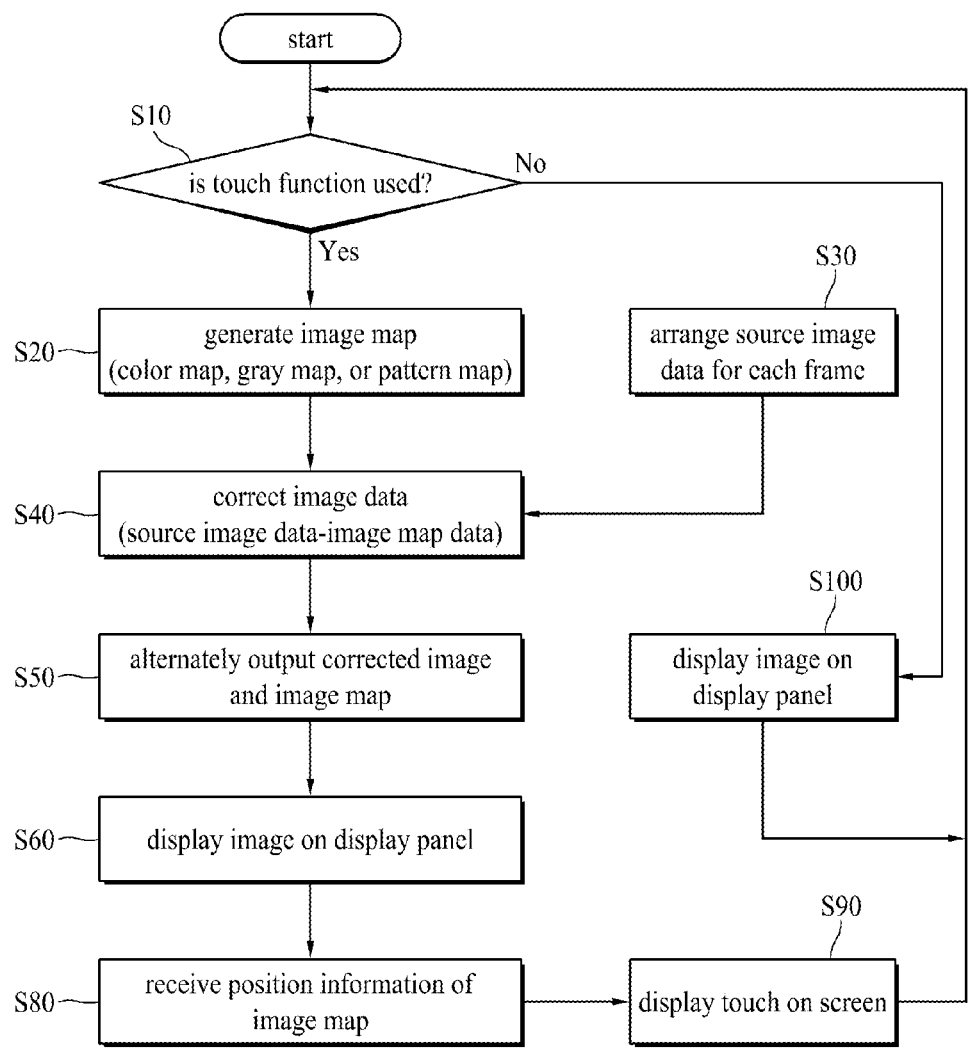
FIGS. 18 and 19 are diagrams illustrating a method of driving the optical touch display device according to the embodiment of the invention.
Figure 19:
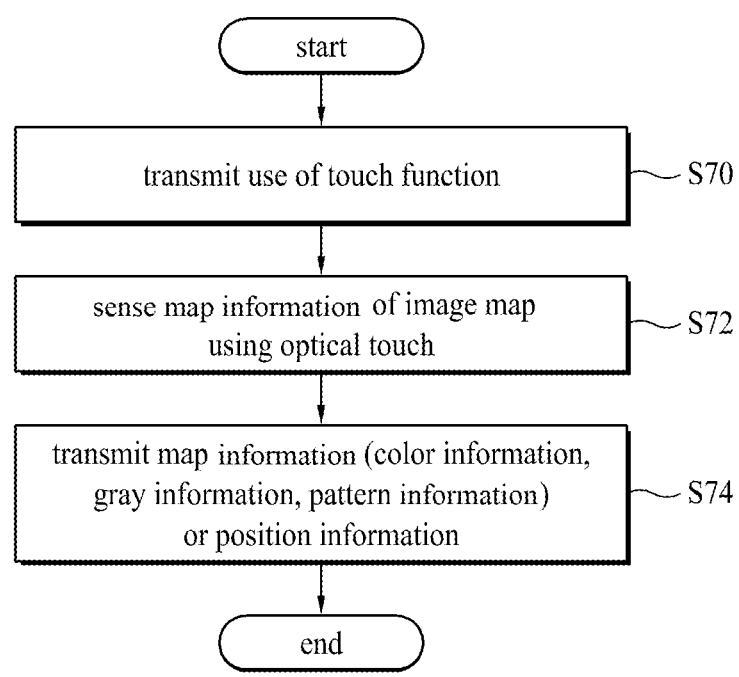

FIGS. 18 and 19 are diagrams illustrating a method of driving the optical touch display device according to the embodiment of the invention. FIG. 18 illustrates driving of the display device for touch sensing using an image map. FIG. 19 illustrates driving of the optical touch pen.

Referring to FIGS. 18 and 19, it is first checked whether a touch function is used (S10). When a touch function is not used, an image map for touch sensing is not generated and an image is displayed on the display panel using an input source image (S100).

On the other hand, when a touch function is used, the timing controller generates an image map (S20). Here, the color map illustrated in FIGS. 12 and 13 may be generated as the image map. When a color map is used as the image map, the color map can be generated by rendering two colors in a two-dimensional space and sequentially labels plural color areas as illustrated in FIG. 12. For example, when a color map is used as an image map, the color map can be generated by rendering two colors in a two-dimensional space, labeling plural color areas, and shuffling the labeled color areas in a random manner.

The gray map illustrated in FIG. 14 may be used as the image map.

The pattern map illustrated in FIG. 17 may be used as the image map.

Subsequently, source image data input from the outside is arranged for each frame (S30).

Thereafter, in order to prevent distortion of a display image due to the image map, the image data is corrected by subtracting image data of the image map from the source image data (S40). That is, the image data to be displayed on the screen is corrected. That is, corrected image data is generated by subtracting the image data of the image map from the source image data of the sub-pixels.

Thereafter, the corrected image data and the image data of the image map are alternately output (S50).

Then, the display image and the image map are alternately displayed on the screen of the display panel (S60). That is, the display image based on the corrected image data and the image of the image map are alternately displayed.

Here, the display image and the image map can be alternately displayed for each frame or for each ½ frame. However, the invention is not limited to these examples, but the display image may be displayed during two to four frames and then the image map may be displayed during one frame.

Thereafter, as illustrated in FIG. 19, the use of the touch function is transmitted to the display device using the optical touch pen (S70).

Then, map information (such as color information, gray information, or pattern information) of the image map is sensed using the optical touch pen (S72).

When the optical touch pen approaches or touches the display panel, map information (such as color information, gray information, or pattern information) of the image map displayed on the display panel is recognized by the optical unit.

Then, the map information (such as color information, gray information, or pattern information) of the image map of the image map recognized by the optical unit 210 is transmitted to the position detector located in the outside via the transmission unit (S74).

For example, as illustrated in FIG. 5B, when the position detector 300 is disposed in the optical touch pen, map information in a lookup table corresponding to the map information of the color area, the gray area, or the pattern area is checked using the lookup table on which the color area, the gray are, or the pattern area on the image map is recorded.

Thereafter, the position information of the corresponding map information (such as color information, gray information, or pattern information) of the image map is detected from the lookup table.

Then, the detected position information, that is, the position information of the position touched by the touch pen 200, is transmitted to the display device (S74).

Subsequently, referred to FIG. 18 again, the position information of the image map is received by the display device (S80).

Thereafter, the position touched by the optical touch pen 200 is displayed on the screen based on the received position information (S90). That is, the display device 100 displays a part corresponding to the position information on the display panel 110 based on the position information received from the position detector 300.

For example, a mouse point is displayed at the position touched by the optical touch pen 200. For this purpose, the timing controller 140 generates position image data corresponding to the position information. In order to display the touched position on the screen, position image data corresponding to the position information is added to the image data and the resultant is transmitted to the data driver 130.

The data driver 130 converts image data including the position information of the position touched by the optical touch pen 200 into an analog data voltage and supplies the sub-pixels. Accordingly, it is possible to display a part touched by the optical touch pen 200 on the screen.

Figure 20:
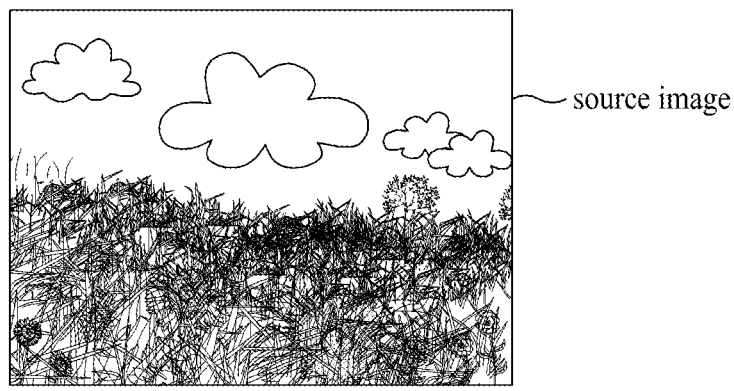
FIG. 20 is a diagram illustrating an example in which position information is generated using a display image.
Figure 20:
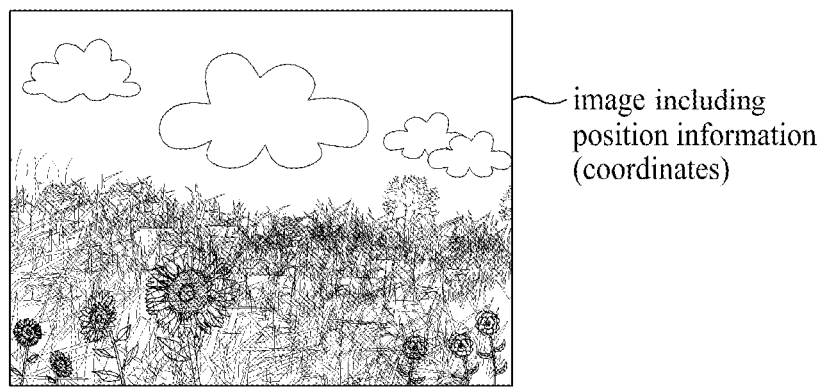

FIG. 20 is a diagram illustrating an example in which position information is generated using a display image.

Referring to FIG. 20, an image is displayed and a touch is detected by including position information in source image data is displayed.

For this purpose, the sub-pixels are uniquely labeled. At this time coordinate values for touch sensing are mapped onto the labels. That is, a coordinate touched by the optical touch pen 200 can be detected using the position information matched with the source image data of the sub-pixels.

When the source image data of plural sub-pixels are the same as the analysis result of the source image data, the source image data of the plural sub-pixels are changed and all the sub-pixels are made to have unique position information using the changed image data.

When the entire screen is sky-blue, the source image data of the sub-pixels are changed to express 20,736 different sky-blue colors. Thereafter, the position information of the sub-pixels are mapped such that all the sub-pixels have unique position information.

The source image data of the sub-pixels are changed such that changes in color and luminance of the sub-pixels are the minimum. The image data of the sub-pixels can be corrected such that a luminance difference from the source image data of the sub-pixels is equal to or less than 10%. The image data of the sub-pixels can be corrected such that a color difference from the source image data of the sub-pixels is equal to or less than 10%.

For example, when the source image data of two sub-pixels are the same, the two sub-pixels can have unique position information by changing the source image data of one sub-pixel. Here, the color or luminance of the second sub-pixel can be changed to be different from that of the first sub-pixel among the two sub-pixels.

For example, when the source image data of three sub-pixels are the same, the three sub-pixels can have unique position information by changing the source image data of two sub-pixels. Here, the color of the second sub-pixel can be changed to be different from that of the first sub-pixel among the three sub-pixels. The luminance of the third sub-pixel can be changed to be different from that of the first sub-pixel.

On the other hand, the source image data is changed for each sub-pixel, but the invention is not limited to this configuration and the source image data may be changed for each pixel.

Figure 21:
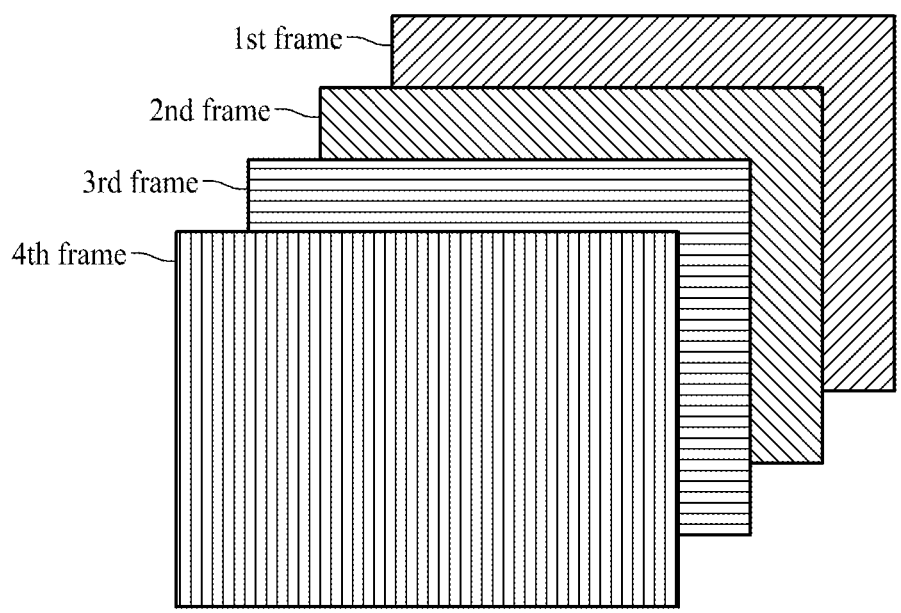
FIG. 21 is a diagram illustrating a method of preventing distortion of an image when position information is included in source image data.

FIG. 21 is a diagram illustrating a method of preventing distortion of an image when position information is included in source image data.

Referring to FIG. 21, in order to reduce image distortion when position information is included in the source image data to form an image map using a display image, the image data of the sub-pixels can be changed such that two neighboring frames have a compensatory relationship.

For example, the source image data of the sub-pixels can be changed such that the first frame and the second frame compensate for the image distortion. The source image data of the sub-pixels can be changed such that the third frame and the fourth frame can mutually compensate for the image distortion. However, the invention is not limited to this example, but the source image data of the sub-pixels can be changed such three or more frames can mutually compensate for image distortion.

In the optical touch display device and the driving method thereof according to the embodiment of the invention, an image map having plural pieces of independent position information (coordinate information) is generated, and the image map is alternately inserted between display images and is displayed. It is possible to achieve touch sensing without constituting a physical touch screen in the display device by detecting position information of an image map using an optical touch pen.

A touched position of the optical touch pen can be displayed based on the position information.

The image map includes a color map in which coordinates constituted by plural colors, a gray map in which coordinates are constituted by gray-scales, or a pattern map in which coordinates are constituted by predetermined patterns.

Plural colors are rendered in a two-dimensional space to generate the color map, and the display image and the color map are alternately displayed.

The color map is generated using two colors of blue and red.

A screen (entire sub-pixels) is segmented in the form of constant tiles to form plural color areas, and each of the color areas has unique position information.

The plural color areas are sequentially labeled in labeling the color areas.

The plural labeled color areas are randomly shuffled and rearranged.

Corrected image data is generated by subtracting the image data of the image map from the source image data of the sub-pixels and the display image based on the corrected image data and the image map are alternately displayed.

Gray patterns having different gray scales are rendered in a two-dimensional space to generate a gray map, and the display image and the gray pam are alternately displayed.

A screen is segmented in the form of constant tiles to form plural gray areas, and each of the gray areas has unique position information.

Patterns having different shapes are dispersed in a two-dimensional space to generate a pattern map, and the display image and the pattern map are alternately displayed.

A screen is segmented in the form of constant tiles to form plural pattern areas, and each of the pattern areas has unique position information.

Position information for touch sensing is mapped onto image data supplied to sub-pixels, and the coordinate touched by the optical touch pen is detected using the position information matched with the image data of the sub-pixels.

When the source image data of plural sub-pixels are the same as the analysis result of the source image data supplied to the sub-pixels, the source image data of one or more sub-pixels is changed.

The source image data of each sub-pixel is changed such that plural neighboring frames have a compensatory relationship.

The position detector includes a lookup table in which position information of the color areas on the image map is described, and detects the position approached or touched by the optical touch pen on the screen of the display device by checking the position information based on the color information.

The image map is generated such that the luminance difference from the display image is equal to or less than 10%.

The method of driving an optical touch display device according to the embodiment of the invention includes: arranging source image data of sub-pixels for each frame and generating an image map for touch sensing; generating corrected image data by subtracting image data of the image map from the source image data; alternately displaying an image based on the corrected image data and the image map;

and sensing map information of a specific position on the image map using an optical touch pen having an optical camera built therein.

The method of driving an optical touch display device further includes sensing position information of a position touched by the optical touch pen on the screen of the display device based on the map information.

A touched position is displayed on the display screen based on the position information.

The method of driving an optical touch display device according to the embodiment of the invention includes: mapping position information for touch sensing onto image data supplied to sub-pixels; sensing map information of a specific position on the image map using an optical touch pen having an optical camera built therein; and detecting a coordinate touched by the optical touch pen using the position information matched with the map information.

The method of driving an optical touch display device further includes analyzing source image data supplied to the sub-pixels and changing the source image data of one or more sub-pixels when the source image data of two or more sub-pixels are the same.

The source image data of the sub-pixels are changed such that plural neighboring frames have a compensatory relationship.

In the optical touch display device and the driving method thereof according to the embodiment of the invention, it is possible to enable displaying of an image and sensing of a touch with high-speed driving using the above-mentioned image map.

In the optical touch display device and the driving method thereof according to the embodiment of the invention, it is possible to enable sensing of a large-area touch and sensing of a multi-touch using the above-mentioned image map.

Since physical touch electrodes are not formed and thus factors such as a decrease in touch sensing performance due to parasitic capacitance are removed in a capacitive type, it is possible to improve touch sensing performance.

It will be understood by those skilled in the art that the invention can be modified in various forms without changing the technical spirit or essential features thereof.

Accordingly, it should be understood that the above-mentioned embodiments are exemplary in all terms and are not restrictive. The scope of the invention is defined not by the above-mentioned detailed description, but by the appended claims. It should be analyzed that all changes and modifications derived from the meanings and the scope of the claims and equivalent concepts thereof are included in the scope of the invention.

What is claimed is:

1. An optical touch display device comprising:
  a display device configured to display a display image based on input source image data and an image map for touch sensing;
  an optical touch pen configured to detect map information of the image map displayed on the display device; and
  a position detector configured to detect position information on a screen based on the map information,
  wherein the display image and the image map are alternately displayed for each frame.

2. The optical touch display device according to claim 1, wherein a touched position of the optical touch pen is displayed based on the position information.

3. The optical touch display device according to claim 1, wherein the image map includes a color map in which coordinates are constituted by a plurality of colors, a gray map in which coordinates are constituted by gray scales, or a pattern map in which coordinates are constituted by predetermined patterns.

4. The optical touch display device according to claim 3, wherein the color map is generated by rendering the plurality of colors in a two-dimensional space, and
  wherein the display image and the color map are alternately displayed.

5. The optical touch display device according to claim 4, wherein the color map is generated using a blue color and a red color.

6. The optical touch display device according to claim 3, wherein a screen is segmented in the form of predetermined tiles to forms a plurality of color areas, and
  wherein each of the plurality of color areas has specific position information.

7. The optical touch display device according to claim 6, wherein each of the plurality of color areas is labeled, and
  wherein the plurality of color areas are sequentially labeled.

8. The optical touch display device according to claim 7, wherein the plurality of color areas labeled are randomly shuffled and rearranged.

9. The optical touch display device according to claim 3, wherein the gray map is generated by rendering gray patterns having different gray scales in a two-dimensional space, and
  wherein the display image and the gray map are alternately displayed.

10. The optical touch display device according to claim 9, wherein a screen is segmented in the form of predetermined tiles to form a plurality of gray areas, and
  wherein each of the plurality of gray areas has specific position information.

11. The optical touch display device according to claim 3, wherein the pattern map is generated by dispersing different patterns in a two-dimensional space, and
  wherein the display image and the pattern map area alternately displayed.

12. The optical touch display device according to claim 11, wherein a screen is segmented in the form of predetermined tiles to form a plurality of pattern areas, and
  wherein each of the plurality of pattern areas has specific position information.

13. The optical touch display device according to claim 1, wherein corrected image data is generated by subtracting image data of the image map from the source image data of each sub-pixel, and
  wherein the display image based on the corrected image data and the image map are alternately displayed.

14. The optical touch display device according to claim 1, wherein position information for touch sensing is mapped onto the image data supplied to each sub-pixel, and
  Wherein a coordinate which is touched by the optical touch pen is detected using the position information mapped onto the image data of the sub-pixels.

15. The optical touch display device according to claim 14, wherein source image data supplied to the sub-pixels is analyzed and the source image data of one or more sub-pixels is changed when the source image data of the sub-pixels are the same.

16. The optical touch display device according to claim 15, wherein the source image data of the sub-pixels are changed such that neighboring frames have a compensatory relationship.

17. The optical touch display device according to claim 1, wherein the position detector includes a lookup table in which position information of the color areas on the image map is recorded, and detects a position approached or touched by the optical touch pen on the screen of the display device by checking the position information corresponding to the color areas.

18. The optical touch display device according to claim 1, wherein the image map is generated such that a luminance difference from the display image is equal to or less than 10%.

* * * * *